United States Patent
Yi et al.

(10) Patent No.: US 10,651,654 B2
(45) Date of Patent: May 12, 2020

(54) MODEL PREDICTIVE CONTROLLER FOR AUTONOMOUS HYBRID MICROGRIDS

(71) Applicants: Zhehan Yi, San Jose, CA (US); Yishen Wang, San Jose, CA (US); Bibin Huang, San Jose, CA (US); Di Shi, San Jose, CA (US); Zhiwei Wang, San Jose, CA (US); Tingting Hou, San Jose, CA (US)

(72) Inventors: Zhehan Yi, San Jose, CA (US); Yishen Wang, San Jose, CA (US); Bibin Huang, San Jose, CA (US); Di Shi, San Jose, CA (US); Zhiwei Wang, San Jose, CA (US); Tingting Hou, San Jose, CA (US)

(73) Assignees: State Grid Corporation of China (CN); GEIRI CO., LTD (CN); State Grid Jiangxi Electric Power Co. (CN)

( * ) Notice: Subject to any disclaimer, the term of this patent is extended or adjusted under 35 U.S.C. 154(b) by 20 days.

(21) Appl. No.: 16/179,805

(22) Filed: Nov. 2, 2018

(65) Prior Publication Data
US 2019/0140453 A1    May 9, 2019

Related U.S. Application Data

(60) Provisional application No. 62/582,823, filed on Nov. 7, 2017.

(51) Int. Cl.
*G05B 13/02* (2006.01)
*H02J 3/38* (2006.01)
(Continued)

(52) U.S. Cl.
CPC ............... *H02J 3/385* (2013.01); *G05F 1/67* (2013.01); *H02J 3/005* (2013.01); *H02J 3/002* (2020.01);
(Continued)

(58) Field of Classification Search
CPC .. H02J 3/381; H02J 3/383; H02J 3/388; H02J 3/46; Y02E 10/563; Y02E 40/34; Y02E 10/763; Y10T 307/707
See application file for complete search history.

(56) References Cited

U.S. PATENT DOCUMENTS 9,240,706 B2 * 1/2016 Patel ......................... H02J 3/44
9,444,257 B2 * 9/2016 Wells ........................ H02J 3/16
(Continued)

OTHER PUBLICATIONS

Babqi et al., "Centralized Finite Control Set Model Predictive Control for Multiple Distributed Generator Small-Scale Microgrid," (Year: 2017).*
(Continued)

*Primary Examiner* — Darrin D Dunn
(74) *Attorney, Agent, or Firm* — Tran & Associates (57) ABSTRACT

A control system is disclosed with a control strategy for autonomous multi-bus hybrid microgrids based on Finite-Control-Set Model Predictive Control (FCS-MPC). The control loops are expedited by predicting the future states and determining the optimal control action before switching signals are sent to converters/inverters. The method eliminates PI and PWM components, and offers 1) accurate PV maximum power point tracking (MPPT) and battery charging/discharging control, 2) DC and AC bus voltage/frequency regulation, and 3) precise and flexible power sharing control among multiple DERs.

17 Claims, 10 Drawing Sheets

(51) Int. Cl.
*H02J 3/00* (2006.01)
*G05F 1/67* (2006.01)
*H02M 7/5387* (2007.01)
*H02M 1/00* (2006.01)

(52) U.S. Cl.
CPC ........... *H02J 3/003* (2020.01); *H02J 2203/20* (2020.01); *H02M 7/5387* (2013.01); *H02M 2001/0003* (2013.01)

(56) References Cited

U.S. PATENT DOCUMENTS

| | | | | |
|---|---|---|---|---|
| 9,692,319 | B1* | 6/2017 | Slavin | H02J 3/382 |
| 2014/0100705 | A1* | 4/2014 | Shi | G06F 1/305 |
| | | | | 700/293 |
| 2014/0252863 | A1* | 9/2014 | Patel | H02J 3/44 |
| | | | | 307/82 |
| 2015/0369217 | A1* | 12/2015 | Gupta | H02J 3/16 |
| | | | | 290/44 |
| 2016/0156190 | A1* | 6/2016 | Wells | H02J 3/16 |
| | | | | 307/18 |
| 2018/0241200 | A1* | 8/2018 | Hu | H02H 3/162 |
| 2019/0103743 | A1* | 4/2019 | Sun | G05B 19/042 |
| 2019/0123662 | A1* | 4/2019 | Zhang | H02J 3/18 |

OTHER PUBLICATIONS

Wells (A Distributed Control Strategy Based on DC Bus Signaling for Modular Photovoltaic Generation Systems With Battery Energy Storage) (Year: 2011).*

Shadnnand et al. (Model Predictive Control of PV Sources in a Smart DC Distribution System: Maximum Power Tracking and Droop Control) (Year: 2014).*

* cited by examiner

MODEL PREDICTIVE CONTROLLER FOR AUTONOMOUS HYBRID MICROGRIDS

TECHNICAL FIELD

This invention relates to finite-control-set model predictive control of autonomous hybrid AC/DC microgrids with multiple buses.

BACKGROUND

Figure 1:
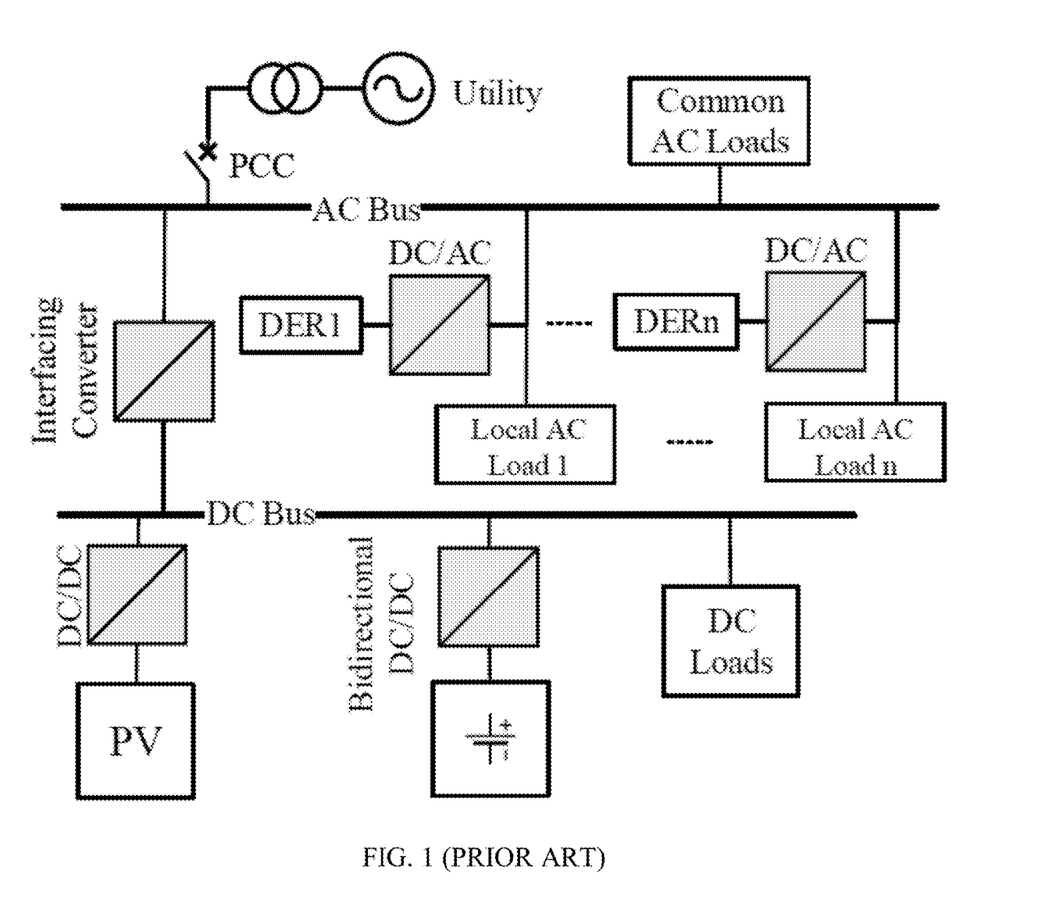
FIG. 1 shows an exemplary AC/DC hybrid microgrid structure.

Deployments of renewable distributed energy resources (DERs) are expected to continuously increase in the near future, due largely to the declining capital investments, political incentives, and attractive natures. Microgrid is a promising solution to integrate DERs with advanced control and energy management systems (EMS), which ensures the reliability while simultaneously offers a multitude of benefits to the utility. Introducing a DC network in a conventional AC microgrid, which forms a hybrid microgrid, is advantageous since it allows DC DERs (e.g., PV and battery storage) and DC loads (e.g., LED lighting and DC ventilation) to be interfaced directly with a higher efficiency. However, the coexistence of both DC and AC buses and DERs requires a sophisticated control system that is capable of managing the power flows effectively and ensuring a regulated bus voltage/frequency. FIG. 1 illustrates a typical hybrid microgrid, where PV and battery storage are integrated at the DC bus via DC/DC converters and DERs are connected at the AC bus with inverters. Each DER may also include a local bus and load. A bidirectional interfacing converter (IC) is installed between the DC and AC bus for power exchanging. The hybrid microgrid can operate in either grid-connected or autonomous mode by switching the circuit breaker at the point of common coupling (PCC).

SUMMARY

In a first aspect, a control scheme for microgrids includes a finite-control-set model predictive control (FCS-MPC) control method for autonomous hybrid AC/DC microgrids with multiple buses; method for controlling a microgrid by collecting power data from a multi-bus hybrid microgrid with at least a converter or an inverter; predicting one or more future states of the microgrid from present and past states of the microgrid; and determining a predetermined control action before switching signals are sent to the converter or inverter using FCS-MPC.

In another aspect, a power control system, includes a multi-bus hybrid microgrid with at least a converter or an inverter; and a processor coupled to the microgrid for predicting one or more future states of the microgrid from present and past states of the microgrid and determining a predetermined control action before switching signals are sent to the converter or inverter using FCS-MPC.

Advantages of the preferred embodiments may include one or more of the following. The system realizes a faster control with better steady-state and dynamic performance and eliminates the needs of proportional-integral (PI) and pulse-width-modulation (PWM) modules for controlling hybrid microgrids. The system eliminates the needs of PI, PWM, and droop control for hybrid microgrids, and provides 1) accurate PV maximum power point tracking (MPPT) and battery charging/discharging control, 2) DC and AC bus voltage/frequency regulation with robust set-point tracking, 3) a precise power sharing control among multiple DERs, and 4) a scalable control scheme for systems with more DERs or loads. The FCS-MPC enables a faster control with satisfactory steady-state and dynamic performance, by predicting the future states of the control objectives and correcting the errors before control commands are applied to converters/inverters. Unlike Proportional-Integral (PI)-based controllers with Pulse Width Modulation (PWM) the present system does not require fine tuning of parameters, which is typically achieved by numerous trial-and-error processes, and needs re-tuning if the system changes. Further, unlike approaches using an adaptive-neural-network (ANN)-based control scheme for hybrid microgrids that improves the dynamic performance and reacts adaptively to varying situations by using virtual flux direct power control (VF-DPC), the present system does not need massive historic data for the training process and where performance relies largely on the selection of training sets. Unlike droop control, the system handles well 1) voltage and frequency deviation, 2) transient performance, and 3) accurate power sharing due to output impedance uncertainty. The system ensures a reliable autonomous hybrid microgrid, controllers must be able to decouple the buses and the intermittent impacts of renewable DERs, as well as controlling a precise power sharing among DERs.

DESCRIPTION

A control system for hybrid microgrids is detailed using finite-control-set model predictive control (FCS-MPC). For simplicity, the controller design procedures are based on the hybrid microgrid configuration illustrated in FIG. 2.

Figure 2:
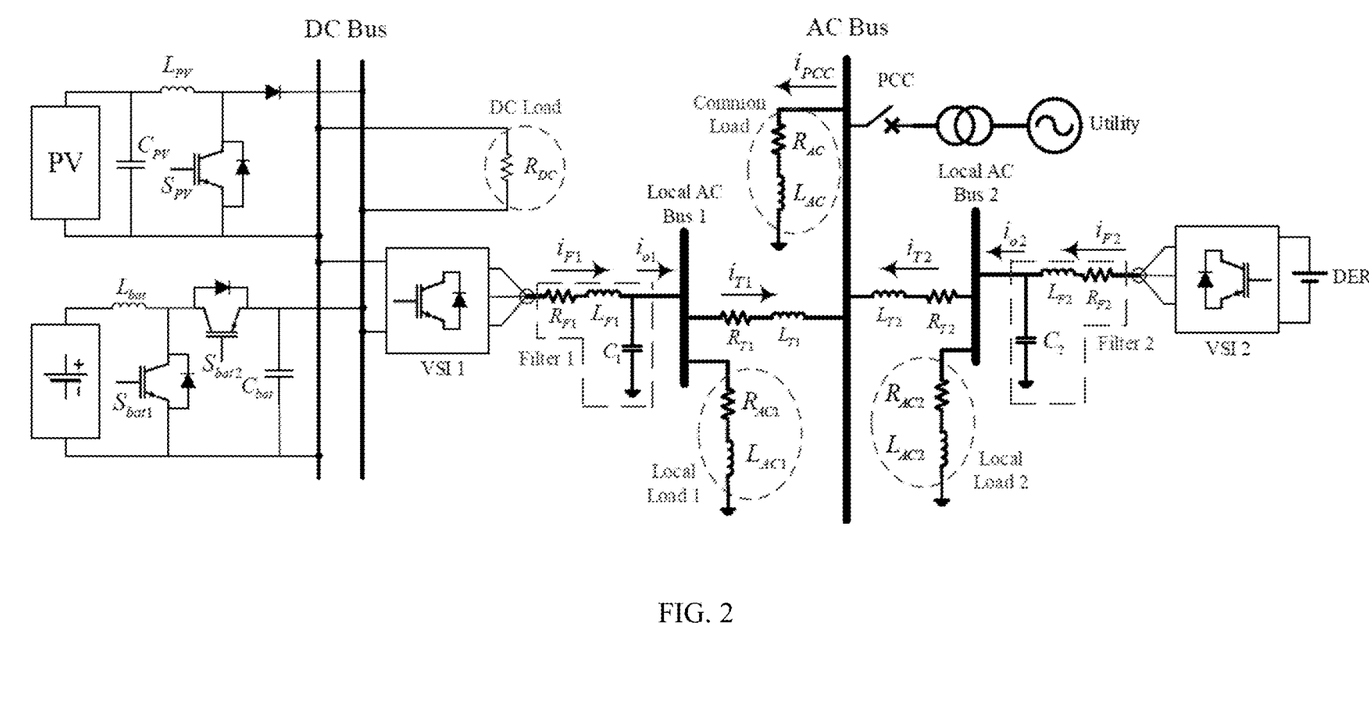
FIG. 2 shows an exemplary multi-bus AC/DC hybrid microgrid configuration.

Turning now to FIG. 2, the hybrid microgrid configuration includes one or more PV arrays connected to a direct current (DC) bus supplying power to DC load, which in practice can be LED lightings, industrial DC motors, DC ventilation system, and DC data center. The microgrid also includes one or more storage devices such as batteries and ultra-capacitors. The PV array or batteries are connected to the DC bus through power switches and converters. Additionally, one or more distributed generators are providing power for the common loads at the PCC bus through voltage source inverters (VSIs). The interfacing converter is connecting the AC and DC sides of the hybrid microgrid and power can be exchanged through this connection. In FIG. 2, $L_{PV}$, $L_{bat}$, $L_{F1}$, $L_{F2}$, $L_{T1}$, $L_{T2}$ are converter, filter and line inductors; $C_{PV}$, $C_{bat}$, $C_1$, $C_2$ are filter capacitors, $R_{F1}$, $R_{F2}$, $R_{T1}$, $R_{T2}$ are line resistors, $S_{PV}$, $S_{bat1}$, $S_{bat2}$ are power-electronics switches, $R_{DC}$ represents the DC loads and $R_{AC}$, $L_{AC}$, $R_{AC1}$, $L_{AC2}$, $R_{AC2}$, $L_{AC2}$ are AC loads at the PCC and local buses; $i_{F1}$, $i_{o1}$, $i_{F2}$, $i_{o2}$, $i_{T1}$, $i_{T2}$, $i_{PCC}$ are currents.

Nevertheless, it is noteworthy that the controller for a system with one or more distributed energy resources (DERs) can be derived using the same approach. In one embodiment, a photovoltaic (PV) array and a battery storage are connected at a direct current (DC) bus via a boost converter and a bidirectional DC/DC converter, respectively, while a DER is interfaced at an alternating current (AC) bus (PCC) via a voltage source inverter (VSI). Another VSI interlinks the DC and AC buses or networks. A local AC bus and a load are at the output of each VSI and another AC load at PCC. The hybrid microgrid operates in islanded mode so the breaker at the PCC is open.

FCS-MPC predicts future behaviors of a system in a predefined time horizon based on current/past states and possible control actuations. By minimizing a desired cost function, optimal control commands (i.e., switching signals) are sent, which leads to minimal error between an objective and a reference target value. Note that the reference for each unit is determined by higher-level EMS, and the preferred embodiment focuses on the primary control of hybrid microgrids. The FCS-MPC is derived based on the discrete-time state space of a converter/inverter, which is formulated as:

$$x(k+1)=Ax(k)+Bu(k) \quad (1)$$

$$y(k+1)=Cx(k)+Du(k) \quad (2)$$

where x is the state variable matrix, u is the control input, y is the output, k denotes the present discrete control step sequence, and A, B, C, D are the state-space matrices. The cost function, Eq. (3), which synthesizes the references, control actuations, and future states of the model, is then minimized subject to certain predefined constraints.

$$J=f[x(k),u(k),x(k+1),u(k+1)\ldots,x(k+N),u(k+N)] \quad (3)$$

where J is the control cost and N is the length of predicting horizon. The optimization process is performed and optimal actuation is updated as the horizon moves on each sampling time with new samples of measurements [17].

The PV Controller

The PV controller aims at extracting the maximum power of the PV array in different operating conditions (i.e., irradiance and temperature). Firstly, a MPPT algorithm (Incremental Conductance [18]) is employed to determine the maximum power reference ($P_{MPP}$) in real time. Based on the state space of boost converter, the next sample time value of the PV current ($I_{PV}(k+1)$) and voltage ($V_{PV}(k+1)$) are given by Eq. (4) and (5) if the next switch command ($S_{PV}$) is "ON" and Eq. (6) and (7) if it is "OFF", where $T_S$ is the sample time and footnotes "1" and "0" of all the following variables denotes the "ON" and "OFF" states of the switches, respectively.

$$I_{PV,1}(k+1) = I_{PV}(k) + \frac{T_S}{L_{PV}} \cdot V_{PV}(k) \quad (4)$$

$$V_{PV,1}(k+1) = 2V_{PV}(k) - V_{PV}(k-1) \quad (5)$$

$$I_{PV,0}(k+1) = I_{PV}(k) \quad (6)$$

$$V_{PV,0}(k+1) = 2V_{PV}(k) - V_{PV}(k-1) \quad (7)$$

Thereby, the prediction of next PV power ($P_{PV}(k+1)$) is calculated by:

$$P_{PV,1}(k+1)=I_{PV,1}(k+1)\cdot V_{PV,1}(k+1) \quad (8)$$

$$P_{PV,0}(k+1)=I_{PV,0}(k+1)\cdot V_{PV,0}(k+1) \quad (9)$$

The cost functions for the PV controller for "ON" and "OFF" states are represented by $J_{PV,1}$ and $J_{PV,0}$ as follows:

$$J_{PV,1}=|P_{PV,1}(k+1)-P_{MPP}| \quad (10)$$

$$J_{PV,0}=|P_{PV,0}(k+1)-P_{MPP}| \quad (11)$$

Figure 3:
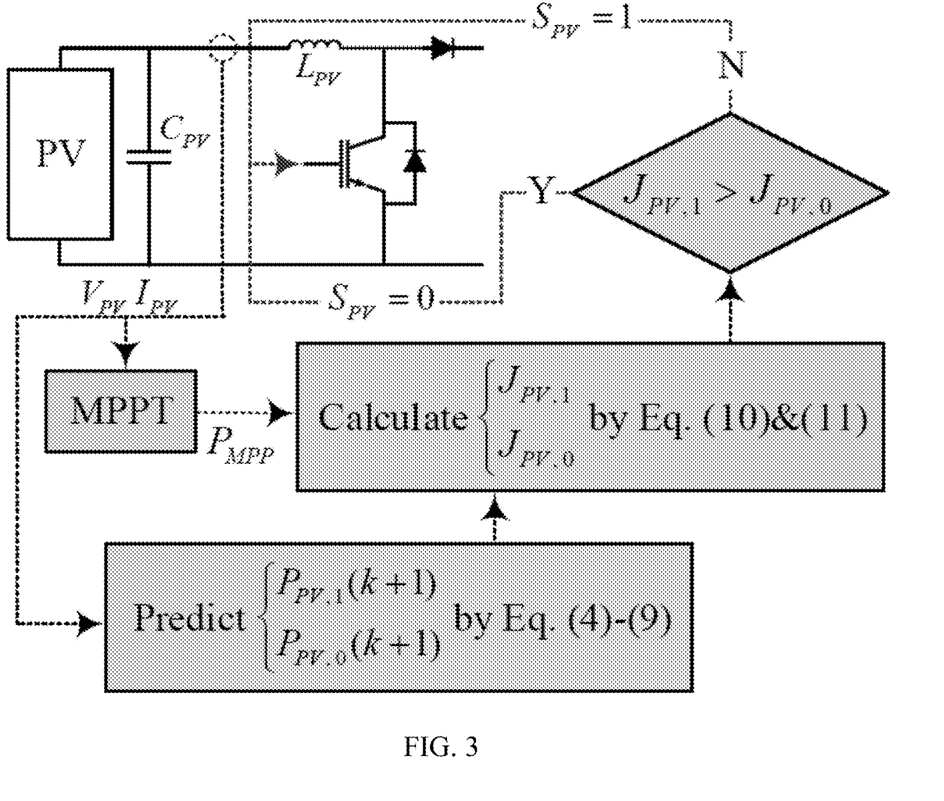
FIG. 3 shows an exemplary Control algorithm for the PV array.

By comparing Eq. (10) and (11), the switching signal that results in a minimal cost will be selected and sent to the converter. This process is presented in FIG. 3.

The Battery Controller

In the autonomous mode of operation, the battery is used to regulate the DC bus while compensating for the power balance between generation and demand. The output voltages of the bidirectional converter, which are also the DC bus voltage $V_{S=(1,0)}^{DC}$ and $V_{S=(0,1)}^{DC}$, can be predicted by Eq. (12) and (13) when the switching signals $S(S_{bat1},S_{bat2})$ equal (1,0) and (0,1), respectively.

$$V_{S=(1,0)}^{DC}(k+1) = \frac{T_S}{C_{bat}} \cdot [I_{bat}(k) - I_o(k)] + V_{DC}(k) \quad (12)$$

$$V_{S=(0,1)}^{DC}(k+1) = -\frac{T_S}{C_{bat}} \cdot I_o(k) + V_{DC}(k) \quad (13)$$

where $I_{bat}$, $I_o$ and $V_{DC}$ are the battery current, converter output current and the DC bus voltage, respectively. Consequently, the cost functions at different switch states, $J_{S=(1,0)}^{DC}$ and $J_{S=(0,1)}^{DC}$ can be defined by:

$$J_{S=(1,0)}^{DC}=|V_{ref}^{DC}-V_{S=(1,0)}^{DC}(k+1)| \quad (14)$$

$$J_{S=(0,1)}^{DC}=|V_{ref}^{DC}-V_{S=(0,1)}^{DC}(k+1)| \quad (15)$$

Figure 4:
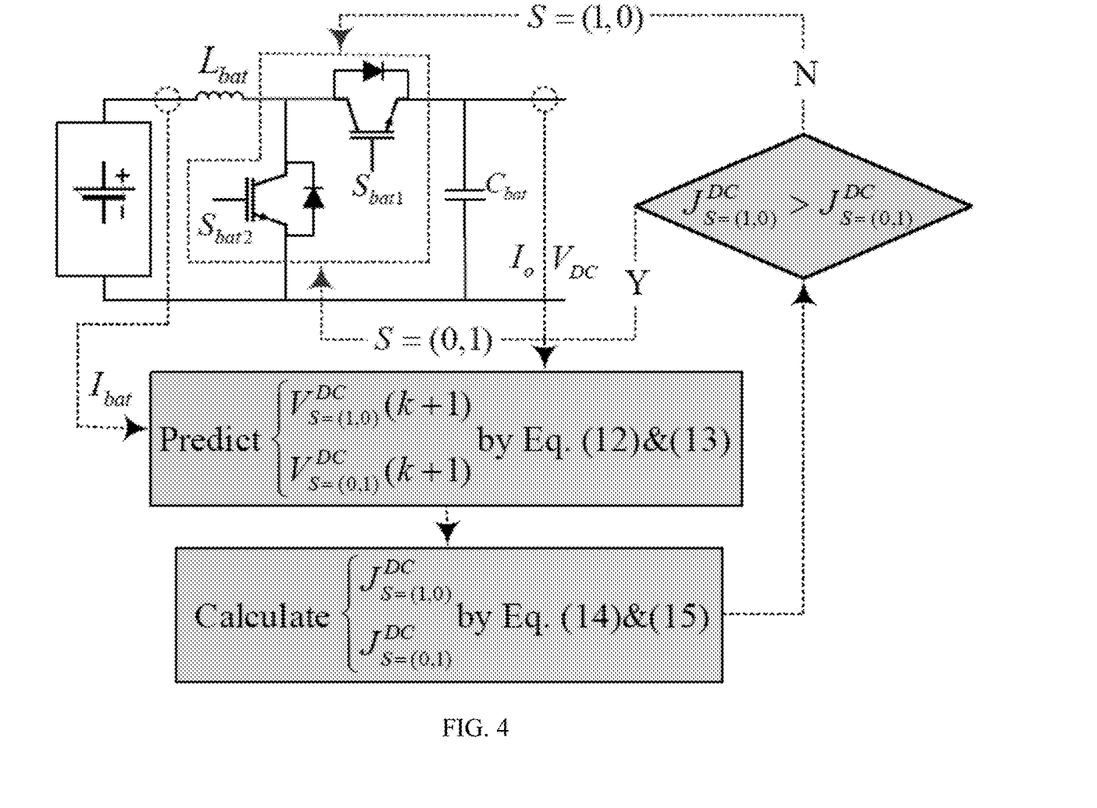
FIG. 4 shows an exemplary Control algorithm for the battery storage.

Depending on the value of each cost function, optimal switching signals that minimize the cost will be delivered to the two switches of the bidirectional converter (FIG. 4).

A. VSI Controller Design with Power Sharing Mechanism

Figure 5:
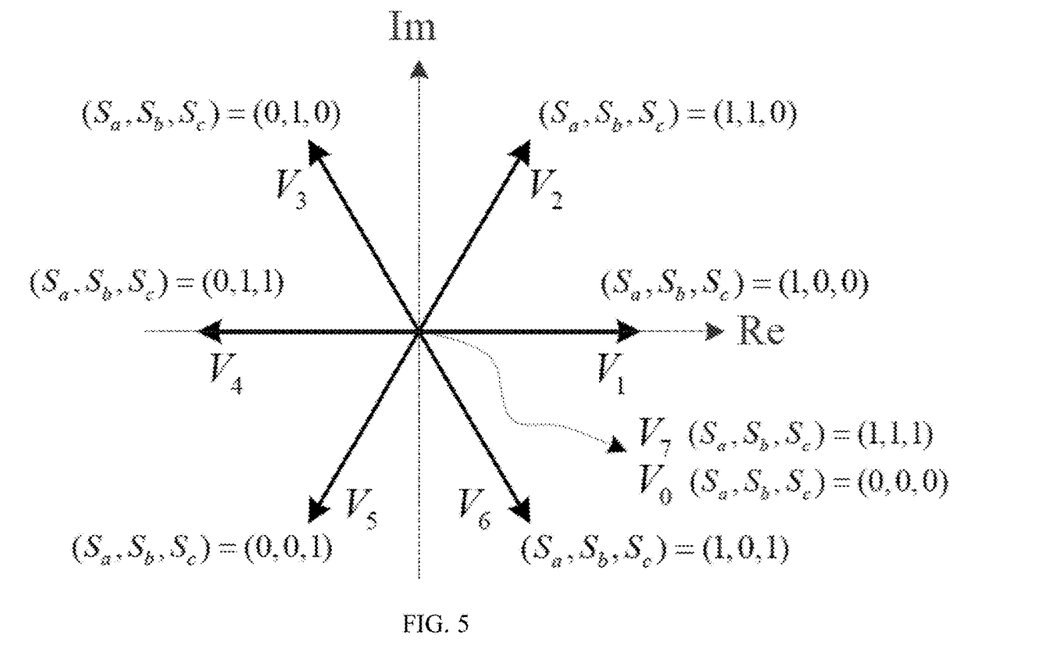
FIG. 5 shows an exemplary Space Vector Modulation (SVM).

In autonomous mode, the voltage and frequency of all AC buses (both common and local) are regulated by controlling the VSIs. A power sharing mechanism between the VSIs for the common loads at the PCC is also integrated in the FCS-MPC. The following process elaborates the controller design for one DER, while the controllers for more DERs can be designed using the same approach. The VSI is a conventional three-phase two-level inverter with three legs and two switches in each leg. Therefore, there will be eight possible switching combinations, which yield eight voltage vectors ($V_n$) for the VSI output:

$$V_n = \begin{cases} \frac{2}{3}V_{in}e^{j(n-1)\frac{\pi}{3}} & n=1,2,\ldots,6 \\ 0 & n=0,7 \end{cases} \quad (16)$$

where $V_{in}$, is the DC input voltage of the VSI. The switching signals for the upper three switches ($S_a,S_b,S_c$) are given based on the Space Vector Modulation (SVM) technique (FIG. 5), while the lower ones are triggered by ($\bar{S}_a, \bar{S}_b, \bar{S}_c$). Therefore, the prediction for VSI 1 in FIG. 2 is derived as:

$$x(k+1) = Ax(k) + BV_n + Ci_{o1}(k) + D[i_{T1}(k) + i_{T2}(k)] \quad (17)$$

where $$x = \begin{bmatrix} i_{F1} \\ v_{Bus1} \\ i_{T1} \end{bmatrix}, A = \begin{bmatrix} 1 - \frac{T_S}{R_{F1}} & -\frac{T_S}{L_{F1}} & 0 \\ \frac{T_S}{C_1} & 1 & 0 \\ 0 & \frac{T_S}{L_{T1}} & 1 - \frac{T_S R_{T1}}{L_{T1}} \end{bmatrix} \quad (18)$$

$$B = \begin{bmatrix} \frac{T_S}{L_{F1}} \\ 0 \\ 0 \end{bmatrix}, C = \begin{bmatrix} 0 \\ -\frac{T_S}{C_1} \\ 0 \end{bmatrix}, D = \begin{bmatrix} 0 \\ 0 \\ -\frac{T_S Z_{AC}}{L_{T1}} \end{bmatrix}$$

$v_{Bus1}$ represents the voltage of local AC bus 1 and $Z_{AC}$ denotes the impedance of the common load at PCC. Thus, the prediction of voltage at PCC (common bus) is:

$$v_{PCC}(k+1) = i_{PCC}(k+1) \cdot Z_{AC}[i_{T1}(k+1) + i_{T2}(k+1)] \cdot Z_{AC} \quad (19)$$

Figure 6:
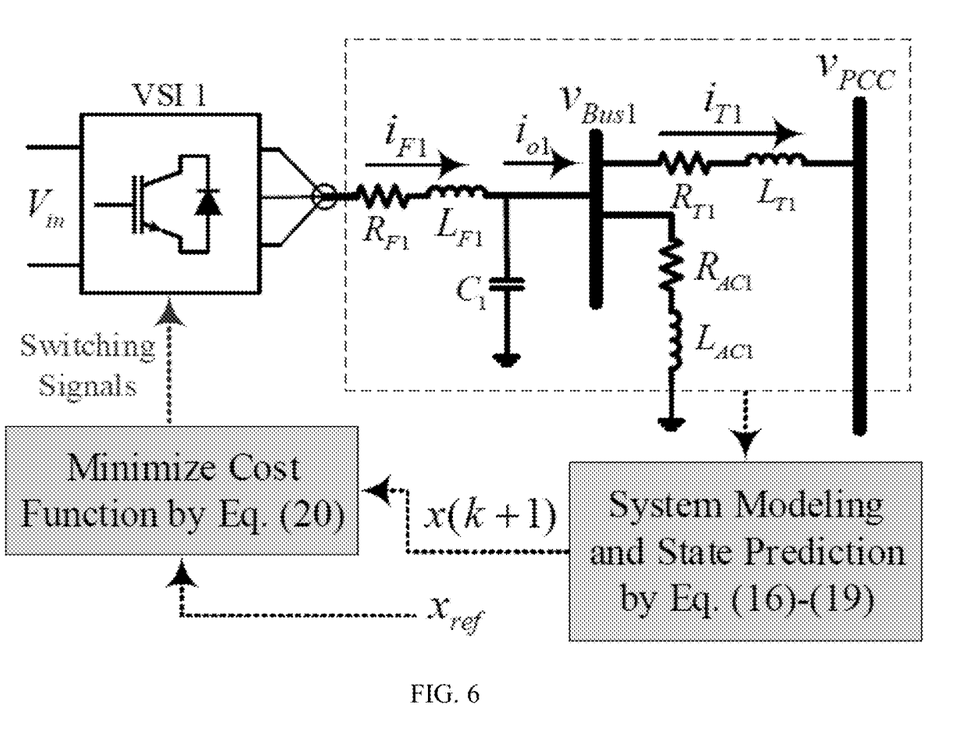
FIG. 6 shows an exemplary Control Algorithm for VSI.

Therefore, the optimal space vector will be selected by minimizing the following cost function:

$$J_{AC} = \lambda [v_{ref} - v_{PCC}(k+1)]^2 + (1-\lambda)[i_{F1}(k+1) + \beta \cdot i_{F2}(k+1)]^2 \quad (20)$$

where $J_{AC}$ is the control cost, $v_{ref}$ is the reference for the PCC voltage and $\lambda$ is the weighting factor. The power sharing mechanism is enabled by introducing the second term in $J_{AC}$ with a power sharing ratio $\beta$ to control the output currents of the two VSIs. For instance, if $\beta=2$, the output power of VSI 1 will be twice of VSI 2. The VSI control process is shown in FIG. 6.

To validate the control strategies, a hybrid microgrid with the same configuration as FIG. 2 is modeled and the FCS-MPC is implemented by Fortran in the PSCAD/EMTDC software package. Multiple case studies are carried out to validate the performance.

Figure 7:
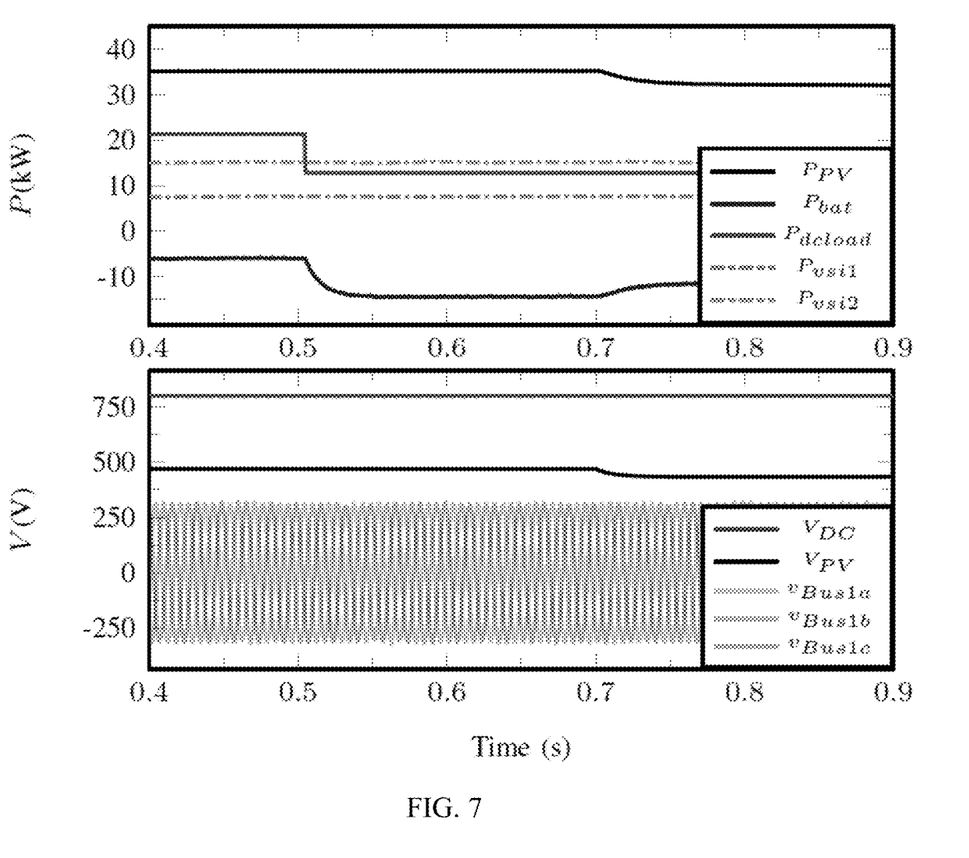
FIG. 7 shows an exemplary Case Study showing powers and voltages.

A first case aims at verifying the scheme for DC side power control and DC/AC bus voltage regulation. The power sharing ratio is set as $\beta=2$. As the results presented in FIG. 7, at 0.5 s, the DC load at the DC bus decreases from 21.5 kW to 13 kW ($P_{dcload}$) Since the PV array is operating in MPPT mode and the power of VSI 1 is controlled by the MPC, the 8.5 kW excess power in the DC network will be absorbed by the battery. As a result, the battery charging power ($P_{bat}$) increases from 6 kW to 14.5 kW in the negative direction. Note that negative power flow indicates charging the battery [19]. At 0.7 s, the irradiance of PV array declines. Consequently, PV voltage ($V_{PV}$) drops and PV power ($P_{PV}$) decreases from 35 kW to 32 kW. The battery power changes from 14.5 kW to 11.5 kW to compensate for the irradiance fluctuation, which ensures a stable DC load power. The output powers of VSI 1 and 2 remain at 7.5 kW and 15 kW ($\beta=2$), respectively. It is worth noting that transitions of all these changes are finished within 50 ms, which demonstrates a fast response speed of the scheme. Moreover, the voltages of DC and AC buses are not affected during the transients.

Figure 8:
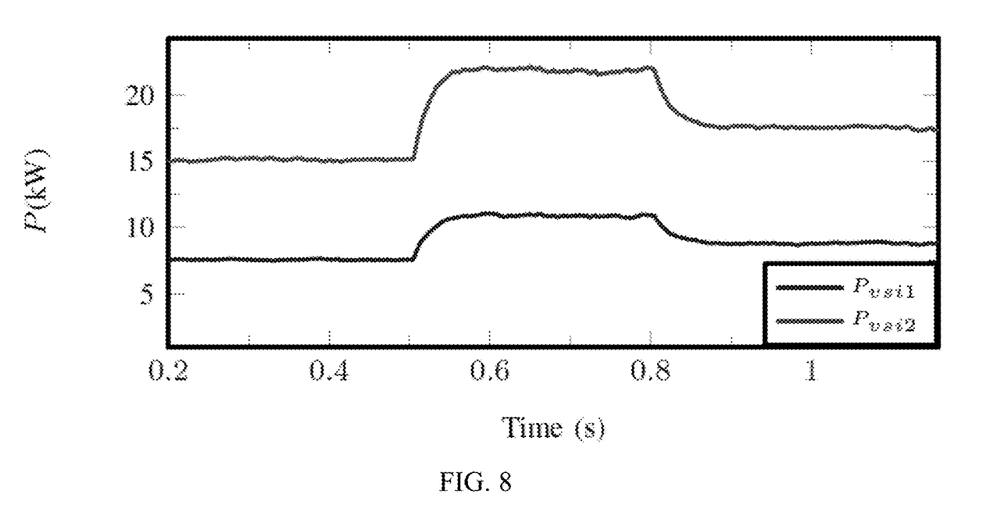
FIG. 8 shows an exemplary Case Study 2 with output powers of the VSIs with $\beta=2$.
Figure 9:
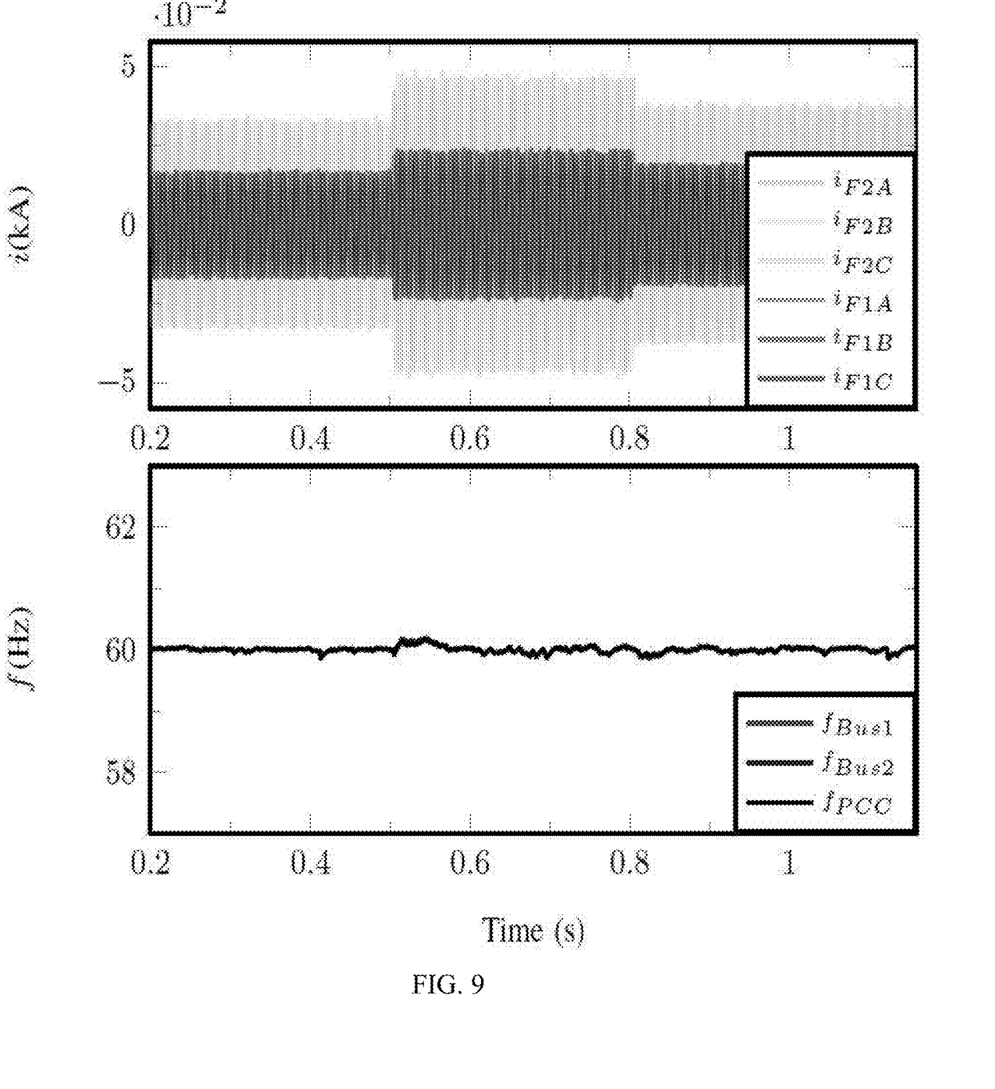
FIG. 9 shows an exemplary Case Study 2 with output current of the VSIs with $\beta=2$ and bus frequencies.

A second case study investigates the performance of power sharing mechanism between the VSIs. Since the microgrid is in islanded mode, power supplied to the load at PCC is shared by VSI 1 and 2, which are initially 7.5 kW and 15 kW with $\beta=2$. As is presented in FIG. 8, at 0.5 s, the common load at PCC increases by 10.5 kW. The powers of VSI 1 and 2 increase by 3.5 kW and 7 kW, respectively, which results in a 11 kW output for VSI 1 and a 22 kW output for VSI 2. Similarly, at 0.8 s, the common load decreases by 6.6 kW, resulting in 8.8 kW for VSI 1 and 17.6 kW for VSI 2. Note that $P_{vsi2}/P_{vsi1}$ is always 2 as controlled by $\beta$. FIG. 9 shows the three-phase output currents of the two VSIs and the frequencies of the three AC buses, where the current magnitude of VSI 2 is always twice of VSI 1 and the bus frequencies remain 60 Hz regardless of negligible fluctuations (less than 0.2%).

Figure 10:
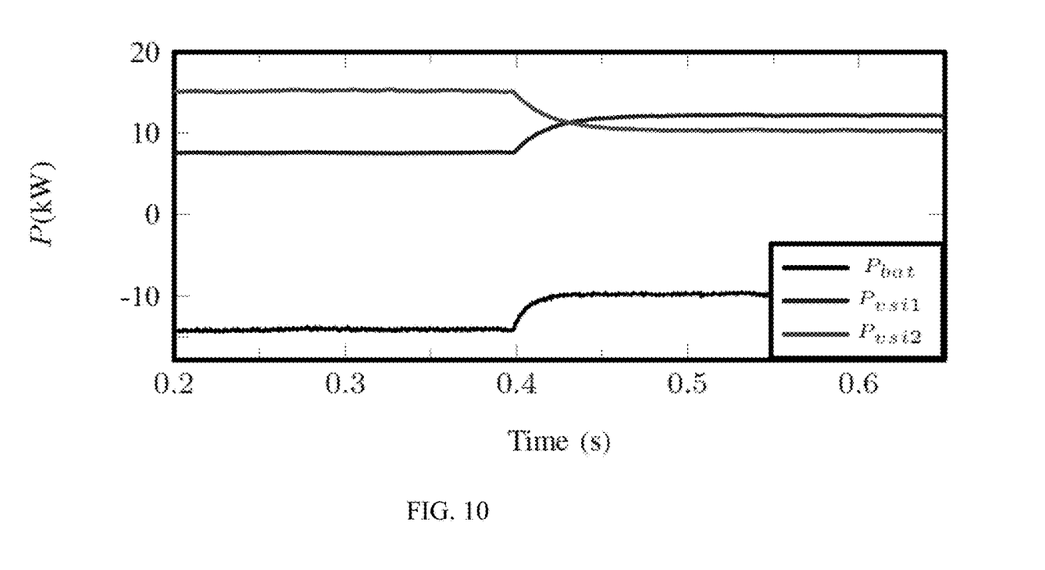
FIG. 10 shows an exemplary Case Study 3 with power sharing ratio changes from $\beta=2$ to $\beta=0.875$.

A third case focuses on verifying the flexibility of the control scheme in adjusting the power sharing ratio ($\beta$). Initially, $\beta$ is set to 2, which yields 7.5 kW and 15 kW for VSI 1 and VSI 2, respectively. At 0.4 s, $\beta$ is adjusted from 2 to 0.875 arbitrarily. The output of VSI 1 ($P_{vsi1}$ in FIG. 10) increases to 10.5 kW whereas the output of VSI 2 ($P_{vsi2}$ decreases to 12 kW, which complies with the power sharing ratio with a constant total power (22.5 kW) for the PCC. Moreover, this verifies the convenience of changing the power sharing ratio, simply by changing $\beta$ in Eq. (20)

The above system introduces a control strategy for hybrid AC/DC microgrid based on FCS-MPC, which eliminates the needs of PI controller, PWM module, and droop control with an improved steady-state and dynamic performance. The scheme predicts the future states of the hybrid microgrid and decides the optimal control actuations before switching signals are sent. It achieves accurate PV MPPT and battery charging/discharging control, DC and AC bus voltage/frequency setpoint tracking, and a precise power sharing control among multiple DERs at the PCC, and offers a scalable MPC design approach for hybrid microgrids, as verified through case studies of the control strategy. Thus, the system realizes a faster control with better steady-state and dynamic performance and eliminates the needs of proportional-integral (PI) and pulse-width-modulation (PWM) modules for controlling hybrid microgrids. The system helps microgrids with multiple distributed energy resources provide an effective solution to integrate renewable energies, e.g., solar photovoltaic (PV). The system also works well with hybrid AC/DC microgrids, which leverage the merits of both AC and DC power systems.

The foregoing system enhances control of autonomous hybrid AC/DC microgrids with multiple buses using finite-control-set model predictive control. A faster control with better steady-state and dynamic performance is achieved, which eliminates the needs of proportional-integral (PI) and pulse-width-modulation (PWM) modules for controlling hybrid microgrids.

Although solar energy is discussed in relation to the above implementations, the system, methods and all other implementations discussed above can also be used and applied in relation to other types of generators and for other forms of energy, such as energy harvested in wind generators and water pumps.

The operation and control features can be implemented in hardware, software or a combination of hardware and software. In the case of software, the software may be embodied in storage media or as firmware. Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

While particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method for controlling a microgrid, comprising:
    collecting power data from a multi-bus hybrid microgrid, wherein the multi-bus hybrid microgrid comprises at least a converter or an inverter;
    predicting one or more future states of the microgrid from present and past states of the microgrid;
    determining a predetermined control action before switching signals are sent to the converter or inverter using Finite-Control-Set Model Predictive Control (FCS-MPC) during autonomous mode by switching a circuit breaker at a point of common coupling (PCC), wherein the VSI is a three-phase two-level inverter with three legs and two switches in each leg; and
    predicting next PV power as:

$$P_{PV,1}(k+1) = I_{PV,1}(k+1) \cdot V_{PV,1}(k+1)$$

$$P_{PV,0}(k+1) = I_{PV,0}(k+1) \cdot V_{PV,0}(k+1),$$

where $P_{PV,1}(k+1)$ and $P_{PV,0}(k+1)$ are next-step predictions of PV power when a converter switch is "ON" and "OFF", respectively, $I_{PV,1}(k+1)$ and $I_{PV,0}(k+1)$ are next-step predictions of PV current when the converter switch is "ON" and "OFF", respectively, $V_{PV,1}(k+1)$ and $V_{PV,0}(k+1)$ are next-step predictions of PV voltage when the converter switch is "ON" and "OFF", respectively, and k is a discrete control step sequence.

2. The method of claim 1, comprising minimizing a cost function before sending control commands to minimize error between an objective and a reference target value.

3. The method of claim 1, comprising determining the FCS-MPC based on a discrete-time state space of a converter/inverter as:

$$x(k+1) = Ax(k) + Bu(k)$$

$$y(k+1) = Cx(k) + Du(k)$$

where x is the state variable matrix, u is the control input, y is the output, k denotes the present discrete control step sequence, and A, B, C, D are the state-space matrices.

4. The method of claim 1, comprising a cost function embodies reference values, control actuations, and future states and then minimized subject to certain predefined constraints.

5. The method of claim 1, comprising a cost function is minimized subject to constraints of:

$$J = f[x(k), u(k), \ldots, x(k+N), u(k+N)]$$

where J is a control cost and N is the length of predicting horizon.

6. The method of claim 1, comprising extracting maximum photovoltaic (PV) power using MPPT.

7. The method of claim 1, comprising determining a maximum power reference ($P_{MPP}$) in real time and based on the state space of a converter, a next sample time value of the PV current ($I_{PV}(k+1)$) and voltage ($V_{PV}(k+1)$), where $T_S$ denotes the sample time, $L_{PV}$ is a total filter inductance of a PV converter, $V_{PV}(k)$ and $I_{PV}(k)$ are present PV voltage and current, $V_{PV}(k-1)$ denotes a previous PV voltage, and k is a discrete control step sequence, further comprising determining:

$$I_{PV,1}(k+1) = I_{PV}(k) + \frac{T_S}{L_{PV}} \cdot V_{PV}(k)$$

$$V_{PV,1}(k+1) = 2V_{PV}(k) - V_{PV}(k-1)$$

$$I_{PV,0}(k+1) = I_{PV}(k)$$

$$V_{PV,0}(k+1) = 2V_{PV}(k) - V_{PV}(k-1).$$

8. The method of claim 1, comprising determining a cost function for a PV controller as:

$$J_{PV,1} = |P_{PV,1}(k+1) - P_{MPP}|$$

$$J_{PV,0} = |P_{PV,0}(k+1) - P_{MPP}|$$

where the cost functions for "ON" and "OFF" states are represented by $J_{PV,1}$ and $J_{PV,0}$, k is a discrete control step sequence, $P_{MPP}$ is a MPPT power reference, and $P_{PV,1}(k+1)$ and $P_{PV,0}(k+1)$ are next-step predictions of PV power when the converter switch is "ON" and "OFF", respectively.

9. The method of claim 1, comprising operating the microgrid in an autonomous mode of operation, wherein a battery is used to regulate a DC bus and compensating for a power balance between generation and demand.

10. The method of claim 1, comprising determining cost functions by:

$$J_{S=(1,0)}^{DC} = |V_{ref}^{DC} - V_{S=(1,0)}^{DC}(k+1)|$$

$$J_{S=(0,1)}^{DC} = |V_{ref}^{DC} - V_{S=(0,1)}^{DC}(k+1)|$$

where the $I_{S=(1,0)}^{DC}$ and $V_{S=(0,1)}^{DC}$ are cost functions when switching signals $S(S_{bat1}, S_{bat2})$ equal (1,0) and (0,1), respectively, $V_{S=(1,0)}^{DC}(k+1)$ and $V_{S=(0,1)}^{DC}(k+1)$ are predictions of a DC bus voltage when switching signals $S(S_{bat1}, S_{bat2})$ equal (1,0) and (0,1), respectively, and $V_{ref}^{DC}$ is a DC bus voltage reference.

11. The method of claim 1, comprising providing switching signals that minimize total cost to switches of the converter.

12. The method of claim 1, comprising performing power sharing between one or more voltage source inverters (VSIs) for common loads at the PCC.

13. The method of claim 12, comprising determining voltage vectors ($V_n$) for the VSI output:

$$V_n = \begin{cases} \frac{2}{3}V_{in}e^{j(n-1)\frac{\pi}{3}} & n = 1, 2, \ldots, 6 \\ 0 & n = 0, 7 \end{cases}$$

where $V_{in}$ is the DC input voltage of the VSI and switching signals for upper three switches ($S_a, S_b, S_c$) are based on Space Vector Modulation (SVM) and lower switches are triggered by the inverting values of ($S_a, S_b, S_c$), which is denoted by ($\overline{S}_a, \overline{S}_b, \overline{S}_c$).

14. The method of claim 13, comprising predicting the future states of VSI as:

$$x(k+1) = Ax(k) + BV_n + Ci_{o1}(k) + D[i_{T1}(k) + i_{T2}(k)]$$

where $$x = \begin{bmatrix} i_{F1} \\ v_{Bus1} \\ i_{T1} \end{bmatrix}, A = \begin{bmatrix} 1 - \frac{T_S}{R_{F1}} & -\frac{T_S}{L_{F1}} & 0 \\ \frac{T_S}{C_1} & 1 & 0 \\ 0 & \frac{T_S}{L_{T1}} & 1 - \frac{T_S R_{T1}}{L_{T1}} \end{bmatrix}$$

$$B = \begin{bmatrix} \frac{T_S}{L_{F1}} \\ 0 \\ 0 \end{bmatrix}, C = \begin{bmatrix} 0 \\ -\frac{T_S}{C_1} \\ 0 \end{bmatrix}, D = \begin{bmatrix} 0 \\ 0 \\ -\frac{T_S Z_{AC}}{L_{T1}} \end{bmatrix}$$

$v_{Bus1}$ represents the voltage of local AC bus 1, $i_{F1}$, $R_{F1}$, $L_{F1}$, $C_1$ are filter output current, filter resistance, filter reactance, filter capacitance of VSI, respectively, $R_{T1}$ and $L_{T1}$ are resistance and reactance of the transmission line between a Bus 1 and a point of common coupling (PCC), $i_{T1}$ is a current flowing from Bus 1 to PCC, $T_S$ is a sampling time, and $Z_{AC}$ denotes an impedance of the common load at PCC.

15. A method for controlling a microgrid, comprising:
collecting power data from a multi-bus hybrid microgrid, wherein the multi-bus hybrid microgrid comprises at least a converter or an inverter;
predicting one or more future states of the microgrid from present and past states of the microgrid;
determining a predetermined control action before switching signals are sent to the converter or inverter using Finite-Control-Set Model Predictive Control (FCS-MPC) during autonomous mode by switching a circuit breaker at a point of common coupling (PCC), wherein the VSI is a three-phase two-level inverter with three legs and two switches in each leg; and
predicting an output voltage of a converter with a DC bus voltage, when a switching signals $S(S_{bat1}, S_{bat2})$ equal (1,0) and (0,1), by determining:

$$V_{S=(1,0)}^{DC}(k+1) = \frac{T_S}{C_{bat}} \cdot [I_{bat}(k) - I_o(k)] + V_{DC}(k)$$

$$V_{S=(0,1)}^{DC}(k+1) = -\frac{T_S}{C_{bat}} \cdot I_o(k) + V_{DC}(k)$$

where $I_{bat}(k)$, $I_o(k)$ and $V_{DC}(k)$ are battery current, converter output current and DC bus voltage, respectively, $T_S$ is a sampling time, $C_{bat}$ is a converter output filter capacitance, $V_{S=(1,0)}^{DC}(k+1)$ and $V_{S=(0,1)}^{DC}(k+1)$ are predictions of a DC bus voltage when switching signals $S(S_{bat1}, S_{bat2})$ equal (1,0) and (0,1), respectively, and k is a discrete control step sequence.

16. A method for controlling a microgrid, comprising:
collecting power data from a multi-bus hybrid microgrid, wherein the multi-bus hybrid microgrid comprises at least a converter or an inverter;
predicting one or more future states of the microgrid from present and past states of the microgrid; and
determining a predetermined control action before switching signals are sent to the converter or inverter using Finite-Control-Set Model Predictive Control (FCS-MPC) during autonomous mode by switching a circuit breaker at a point of common coupling (PCC), wherein the VSI is a three-phase two-level inverter with three legs and two switches in each leg, further comprising predicting voltage at the PCC (common bus) as:

$$v_{PCC}(k+1) = i_{PCC}(k+1) \cdot Z_{AC} = [i_{T1}(k+1) + i_{T2}(k+1)] \cdot Z_{AC}.$$

where $Z_{AC}$ is a common load impedance at PCC, $v_{PCC}(k+1)$ is a next-step prediction of PCC voltage, $i_{PCC}(k+1)$ is a next-step prediction of a common load current, and $i_{T1}(k+1)$ and $i_{T2}(k+1)$ are currents flowing from Bus 1 and Bus 2 to PCC, respectively.

17. The method of claim 16 comprising:
selecting an optimal space vector by minimizing:

$$J_{AC} = \lambda [v_{ref} - v_{PCC}(k+1)]^2 + (1-\lambda)[i_{F1}(k+1) + \beta \cdot i_{F2}(k+1)]^2$$

where $J_{AC}$ is a control cost, $v_{ref}$ is a reference for the PCC voltage and $\lambda$ is a weighting factor, $v_{PCC}(k+1)$ is a next-step prediction of PCC voltage, and $i_{F1}(k+1)$ and $i_{F2}(k+1)$ are next-step predictions of filter output currents of VSI 1 and VSI 2, respectively,
performing power sharing with a power sharing ratio $\beta$ to control output currents of the VSIs.

* * * * *